(12) United States Patent
Clausen (10) Patent No.: US 7,338,065 B1
(45) Date of Patent: Mar. 4, 2008

(54) HITCH ASSEMBLY

(75) Inventor: Eivind Clausen, Bellingham, WA (US)

(73) Assignee: Allsop, Inc., Bellingham, WA (US)

( * ) Notice: Subject to any disclaimer, the term of this patent is extended or adjusted under 35 U.S.C. 154(b) by 0 days.

(21) Appl. No.: 10/850,962

(22) Filed: May 20, 2004

Related U.S. Application Data (60) Provisional application No. 60/472,250, filed on May 20, 2003.

(51) Int. Cl.
*B60D 1/60* (2006.01)
(52) U.S. Cl. .................... 280/507; 280/505; 280/515
(58) Field of Classification Search ............ 280/507, 280/506, 515
See application file for complete search history.

(56) References Cited

U.S. PATENT DOCUMENTS

| 6,334,561 | B1 * | 1/2002 | Cole ....................... 224/521 |
|---|---|---|---|
| 6,409,203 | B1 * | 6/2002 | Williams ................. 280/506 |
| 6,672,115 | B2 * | 1/2004 | Wyers ....................... 70/14 |
| 6,773,200 | B2 * | 8/2004 | Cole ....................... 403/378 |
| 6,862,905 | B2 * | 3/2005 | Zapushek ................... 70/34 |
| 2002/0145270 | A1 * | 10/2002 | Williams ................. 280/506 |

* cited by examiner

*Primary Examiner*—Lesley D. Morris
*Assistant Examiner*—Marlon Arce-Diaz
(74) *Attorney, Agent, or Firm*—Christensen O'Connor Johnson Kindness PLLC (57) ABSTRACT

A hitch assembly 24 configured for reducing or eliminating undesirable play or movement between its components. The hitch assembly 24 includes a conventional hitch receiver 24 and a hitch receiver attachment structure 28, which is adapted to be telescopingly inserted into the hitch receiver 24. The hitch assembly 20 includes a securement and anti-chatter assembly for securing together the hitch receiver 24 and a hitch receiver attachment structure 28 while reducing the chatter generated therebetween during use.

6 Claims, 10 Drawing Sheets

HITCH ASSEMBLY

CROSS-REFERENCE(S) TO RELATED APPLICATION(S)

The present application claims the benefit of U.S. Provisional Application No. 60/472,250, filed May 20, 2003, the disclosure of which is hereby incorporated by reference.

FIELD OF THE INVENTION

The present invention relates to hitch assemblies for vehicles, and more particularly, to hitch assemblies that reduce or eliminate play between respective components of the hitch assembly.

BACKGROUND OF THE INVENTION

Many vehicles today are equipped with receiver-type trailer hitches. Typically, these types of trailer hitches include a square hitch receiver, normally 1 and ¼ or 2 inches in internal height and width, attached to the undercarriage of the vehicle. A second slide tube, which acts as a shank, includes outer dimensions slightly smaller than the internal dimensions of the hitch receiver so that it may be slideable within the hitch receiver. Once inserted, the slide tube is connected to the hitch receiver by a fastener inserted through the two tubes to prevent relative movement therebetween.

The slide tube may include a standard ball-mount for engaging with the hitch of a trailer or other wheeled vehicle. Another popular use for receiver hitches is the use as a coupling device for installing equipment racks onto the vehicle. Bicycle carrier racks, ski carriers, storage boxes and other types of carriers have been designed to use the above-described hitch slide tube to engage within a receiver hitch tube. This provides a universal system that allows a vehicle user to be able to use various trailers and carriers with a single coupling system.

One particular problem with the use of these conventional hitch assemblies is the clearance between the internal dimensions of the hitch receiver and the external dimensions of the slide tube. These tubes by necessity must have sufficient clearance therebetween so that the slide tube is efficiently and easily telescopingly received within the hitch receiver. However, this clearance between the two tubes causes relative movement therebetween, which potentially results in a slide tube that rattles or chatters within the hitch receiver during use. This rattle or chatter is at best an annoyance and at worst can distract the driver or cause damage to the trailer or the carrier.

SUMMARY OF THE INVENTION

The present invention is direct to embodiments of a hitch assembly and components thereof. Embodiments of the hitch assembly are configured for reducing or eliminating undesirable play or movement between its components. In one embodiment, the hitch assembly includes a conventional hitch receiver and a hitch receiver attachment structure, which is adapted to be telescopingly inserted into the hitch receiver. In one embodiment, the hitch assembly includes a securement and anti-chatter assembly for securing together the hitch receiver and a hitch receiver attachment structure while reducing the chatter generated therebetween during use.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Embodiments of the present invention will now be described with reference to the accompanying drawings where like numerals correspond to like elements. Embodiments of the present invention are directed to hitch assemblies configured to reduce or eliminate undesirable movement between a vehicle's hitch receiver and hitch receiver attachment structures. It is to be expressly understood that the descriptive embodiments are provided herein for explanatory purposes only and is not meant to unduly limit the inventions, as claimed.

Figure 1:
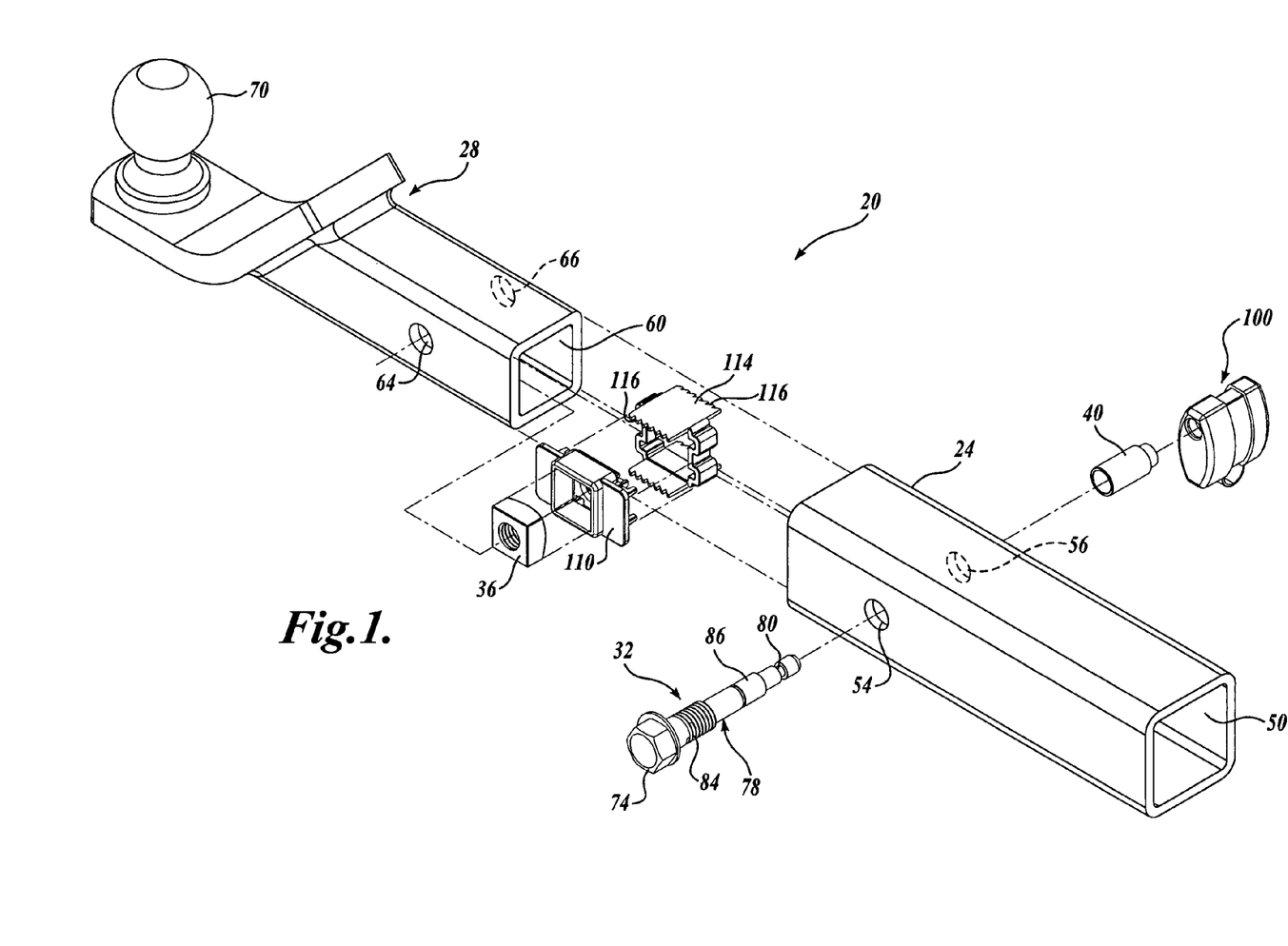
FIG. 1 is an exploded perspective view of one embodiment of a hitch assembly constructed in accordance with aspects the present invention.

Referring now to FIG. 1, an exploded perspective view of one embodiment of a hitch assembly 20 constructed in accordance with the present invention is shown. The hitch assembly 20 is suitably configured for reducing or eliminating undesirable play or movement between its components. The hitch assembly 20 includes a conventional hitch receiver 24 and a hitch receiver attachment structure 28, sometimes referred to as a slide structure, adapted to be telescopingly inserted into the hitch receiver 24. The hitch assembly 20 includes a securement and anti-chatter assembly for securing together the hitch receiver 24 and a hitch receiver attachment structure 28 while reducing the chatter generated therebetween during use. As will be described in more detail below, one embodiment of the securement and anti-chatter assembly includes a hitch pin 32 and an internally threaded sleeve or nut 36, for selectively securing the hitch receiver attachment structure 28 to the hitch receiver 24. Optionally, the securement and anti-chatter assembly includes a sleeve 40 for aiding in the reduction of chatter between the hitch receiver attachment structure 28 and the hitch receiver 24. Each of the components of the hitch assembly 20 will now be described in greater detail.

The hitch receiver 24 is a tube-like structure, preferably constructed of a metallic material, having a generally rectangular interior opening 50. The hitch receiver 24 is adapted to be mounted to the rear bumper region of a vehicle (not shown) to provide an open-ended socket for receiving the hitch receiver attachment structure 28 or the like within the interior opening 50. The hitch receiver 24 includes opposing side holes 54 and 56 for receiving the hitch pin 32, as well be described in detail below. In one embodiment of the present invention, the hitch receiver 24 includes either a 1¼ inch square tubing or 2 inch square tubing. It should be understood, however, that other sizes or shapes of tubing can be used as well.

Figure 2:
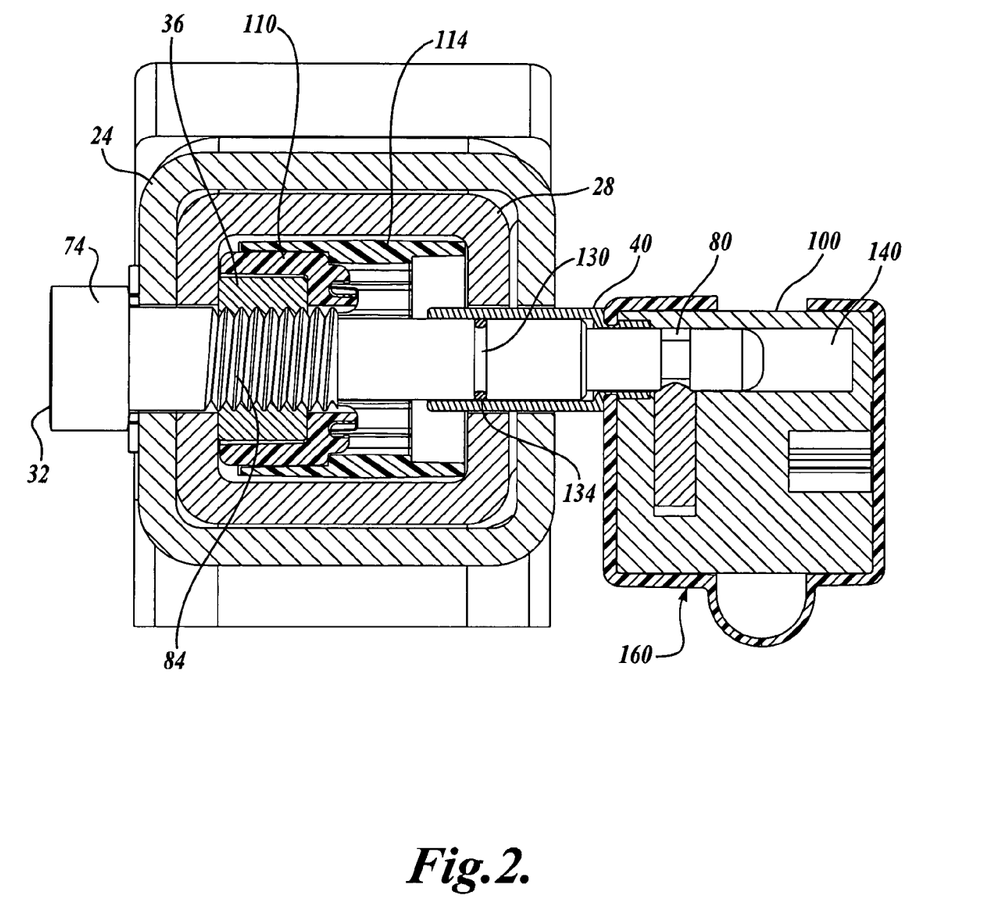
FIG. 2 is a cross sectional view of the hitch assembly of FIG. 1.

In the embodiment illustrated in FIGS. 1 and 2, the hitch receiver attachment structure 28 is likewise tube-like, having an exterior shape corresponding to the interior opening 50 and defining an interior channel 60. The cross-sectional dimensions of the hitch receiver attachment structure 28 are slightly smaller as compared to the interior opening 50 of the hitch receiver 24 so that the hitch receiver attachment structure 28 may be loosely telescopingly received within the hitch receiver 24. In several embodiments of the hitch assembly 20, the difference in the dimensions of the interior opening 50 of the hitch receiver 24 and the external surface of the hitch receiver attachment structure 28 is about ⅟₁₆ inch (one-sixteenth inch) to allow the hitch receiver attachment structure 28 to be easily inserted within the hitch receiver 24. The hitch receiver attachment structure 28 also includes opposing side holes 64, 66 that align with the opposing side holes 54, 56 of the hitch receiver 24, respectively, as the hitch receiver attachment structure 28 is inserted into the hitch receiver 24.

In the exemplary embodiment shown in FIG. 1, the hitch receiver attachment structure 28 is illustrated as having a trailer hitch ball 70 coupled thereto. However, it will be appreciated that the hitch receiver attachment structure 28 may be secured to, or formed integrally with, other structures (not shown) to provide a means for securing an object to a vehicle. For example, the hitch receiver attachment structure 28 may be secured to a cargo carrier for carrying luggage and other loads, or to a rack configured to carry recreational equipment, such as a bicycle, snowboard, skis, etc., or to a platform to name a few.

Still referring to FIGS. 1 and 2, the securement and anti-chatter assembly includes a hitch pin 32. The hitch pin 32 includes a head portion 74, an elongated portion 78, and a locking groove 80. The elongated portion 78 includes a threaded section 84 and a reduced diameter portion 86. In the embodiment illustrated in FIG. 1, the head portion 74 is hexagonally shaped to be turned by a conventional wrench. However, other shape or configuration may be used. For example, the head portion 74 could be wing shape, square shaped, or configured with an Allen shaped slot to name a few. In one embodiment shown in FIG. 4, a handle 90 is pivotally connected to the head portion 74 for ease of turning the hitch pin 32 without tools. The handle 90 is pivotally connected to the head portion 74 and includes a ball bearing 94 biased by a spring 96 or other biasing member.

When assembled, the hitch pin 32 is inserted into respective aligned holes 54, 64 and 56, 66 for securing the hitch receiver attachment structure 28 to the hitch receiver 24. As will be described in detail below, the end of the hitch pin 32 may be locked in the assembled position by any known locking mechanism for preventing the hitch receiver attachment structure 28 from being removed from the hitch receiver 24. One example of a locking mechanism is the pin lock 100 shown in FIGS. 1-3. The pin lock 100 is conventional, and thus, will not be described in detail.

The securement and anti-chatter assembly further includes coupling structure, such as a threaded sleeve or nut 36, having an internal threaded bore cooperatively configured to engage the threaded portion 84 of the hitch pin 32. The nut 36 is positioned adjacent one side wall in coaxial alignment with the hole 64 and is prevented from rotating. In the embodiment shown in FIGS. 1 and 2, the nut 36 may be fixedly secured to a nut holder 110 that is capable of sliding within the interior opening 60 of the hitch receiver attachment structure 28. The nut holder 110 is sized and configured so that once inserted into the interior opening 60 of the hitch receiver attachment structure 28, the nut holder 110 is restricted from rotating therein. Alternatively, the nut 36 may be fixedly secured to the inside surface of one side wall of the hitch receiver attachment structure 28 by, for example, welding or adhesive. In another embodiment, one side wall of the hitch receiver attachment structure 28 may define an internally threaded bore.

Figure 4:
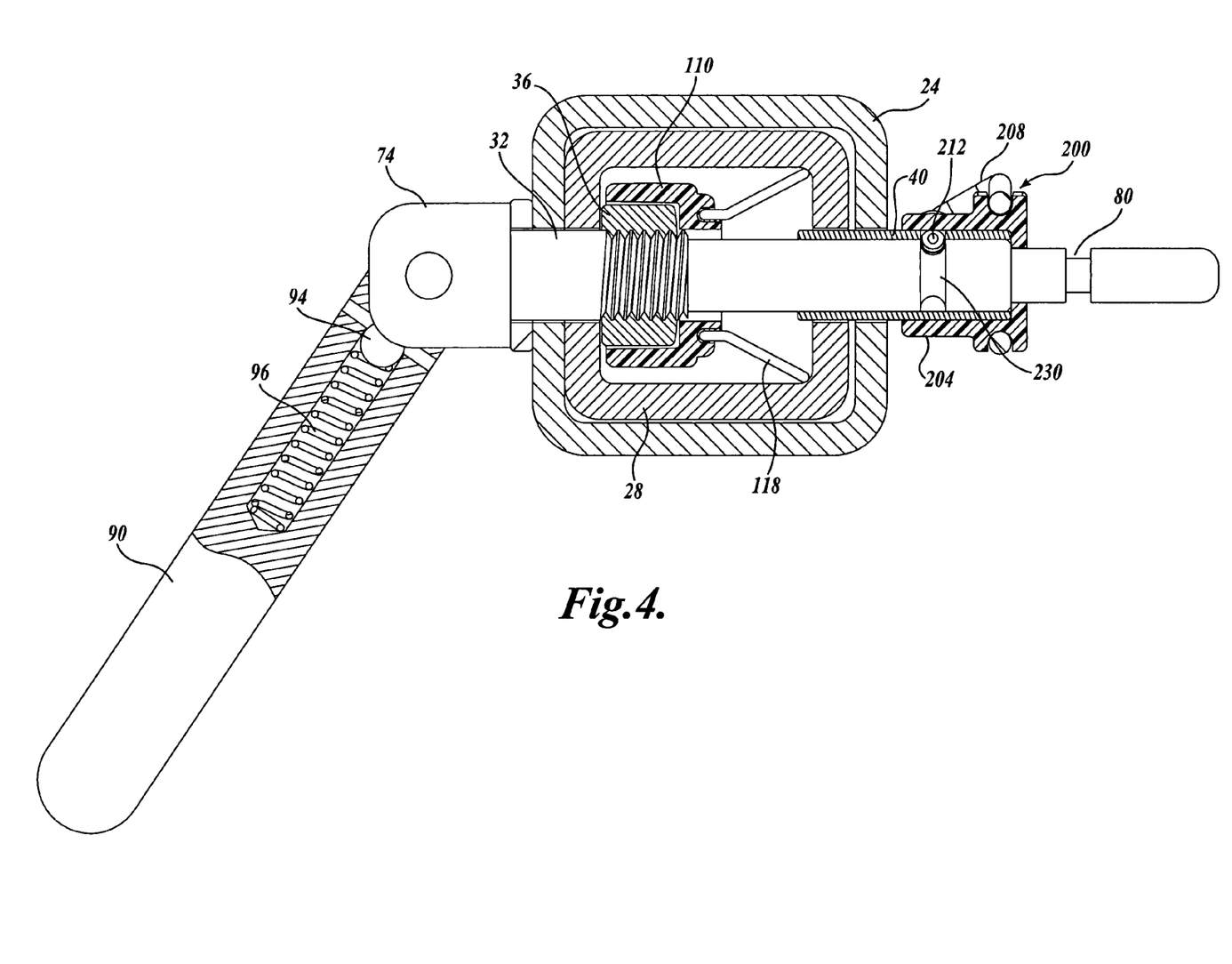
FIG. 4 is a cross sectional view of another embodiment of a hitch assembly constructed in accordance with aspects the present invention.
Figure 5:
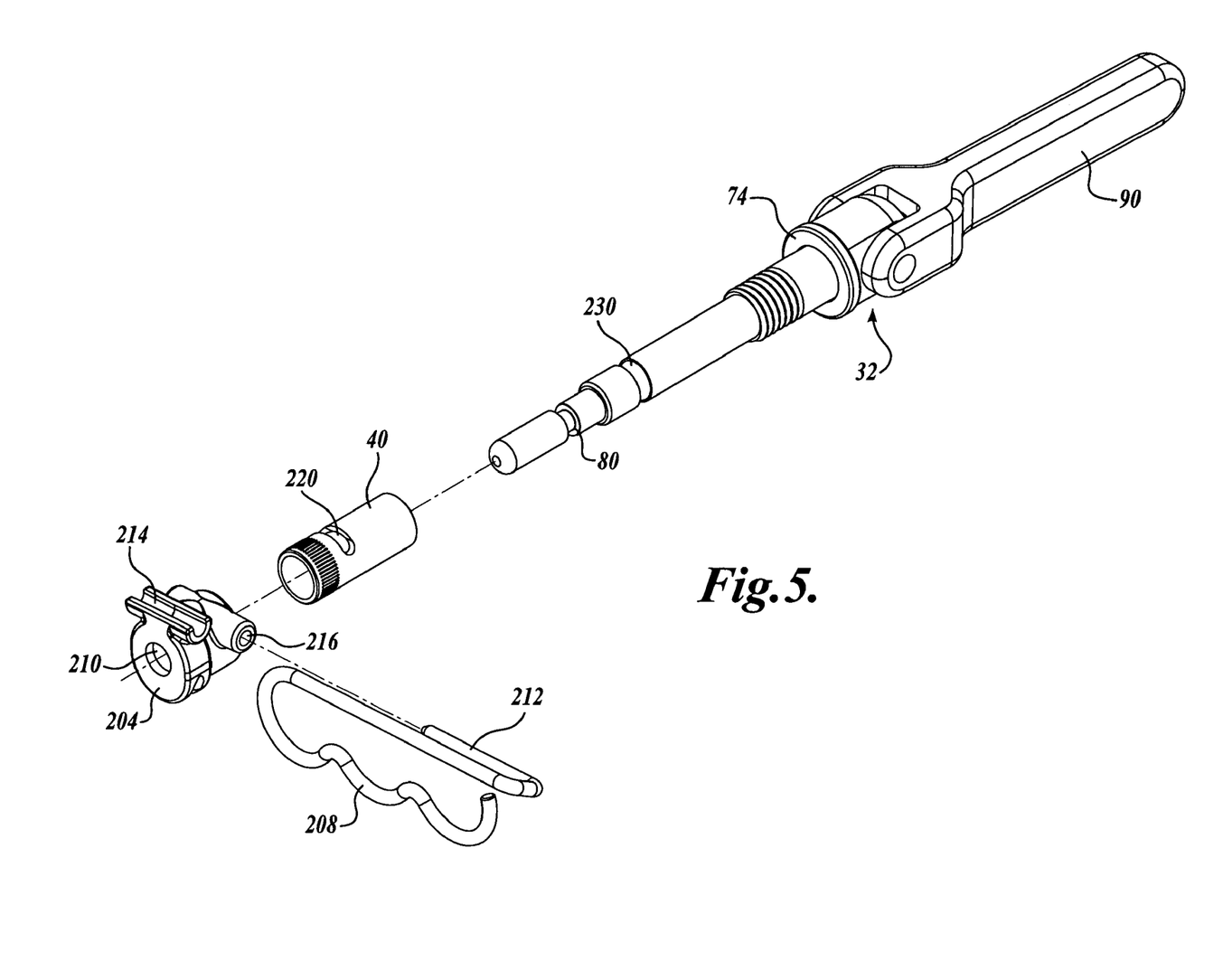
FIG. 5 is an exploded perspective view of several components of a securement and anti-chatter assembly suitable for incorporation in the embodiments of FIGS. 1 and 4.
Figure 6:
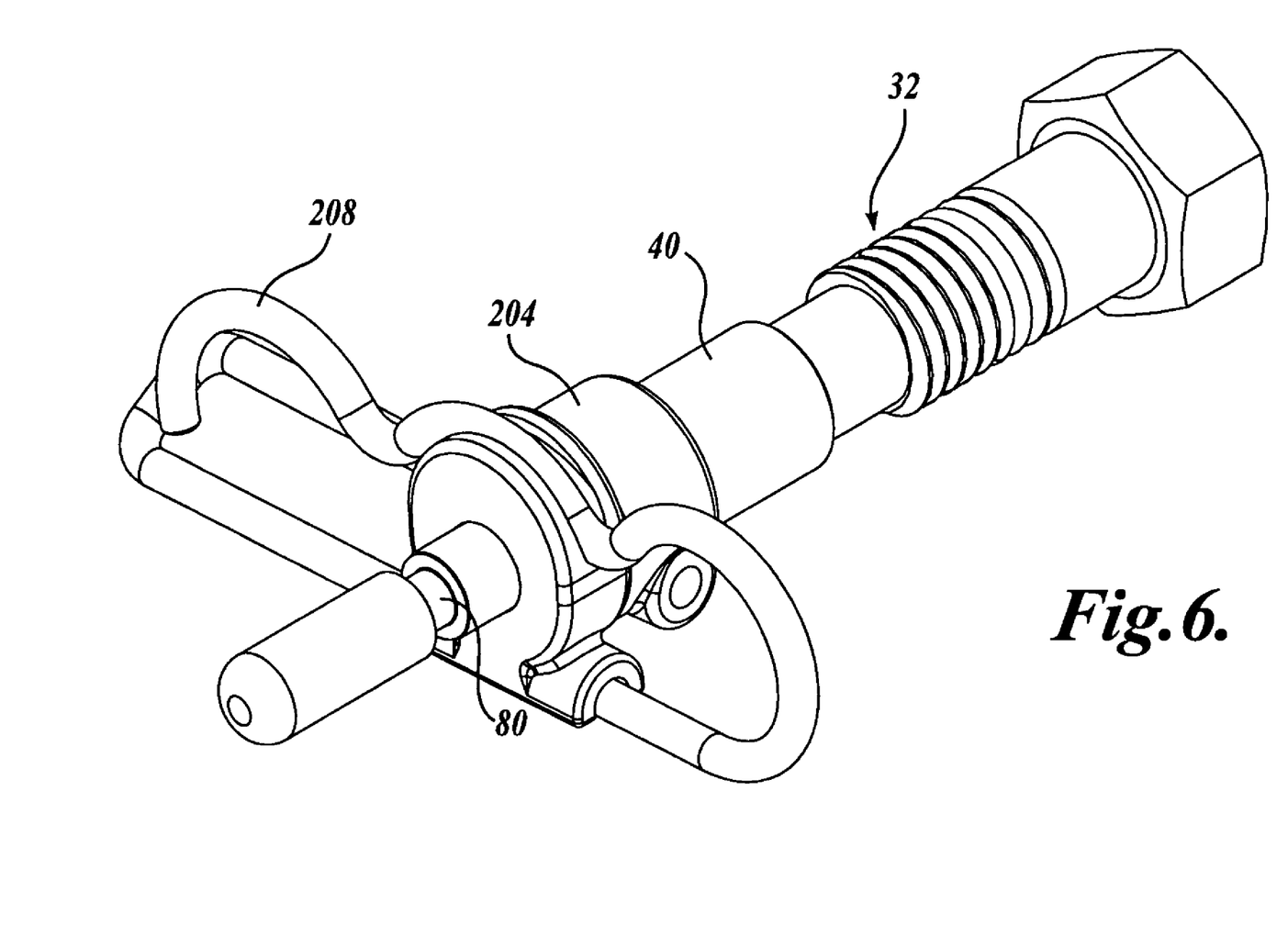
FIG. 6 is an assembled perspective view of an alternative embodiment of several components of a securement and anti-chatter assembly suitable for incorporation in the embodiments of FIGS. 1 and 4.
Figure 10:
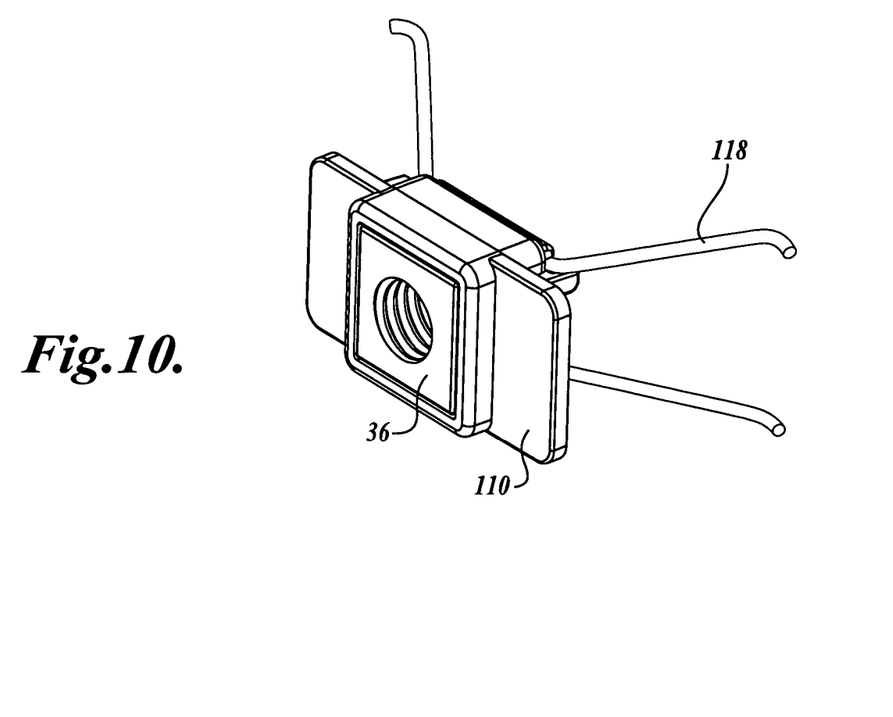
FIGS. 10 and 11 are front and rear perspective views of a nut placement system constructed in accordance with aspects of the present invention.
Figure 11:
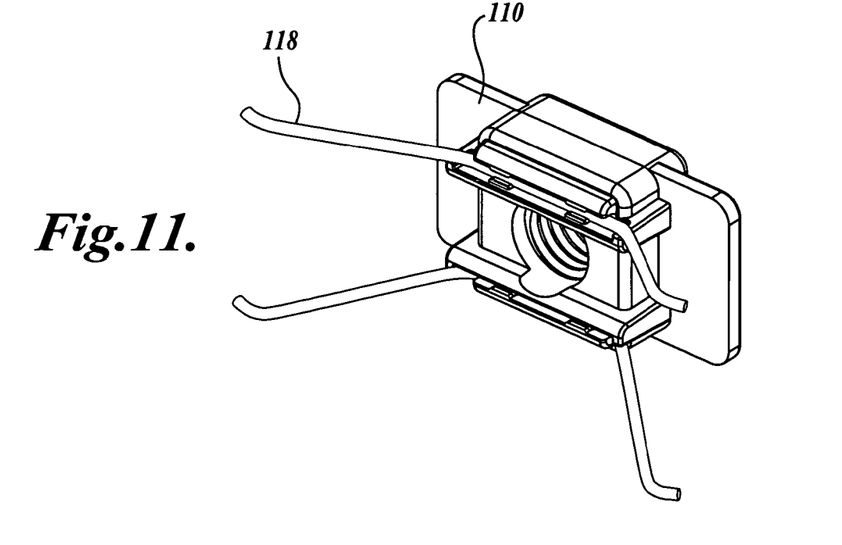

In the embodiment shown in FIGS. 1 and 2, the nut holder 110 may be seatedly or otherwise connected to an adapter 114, preferably constructed of either a rigid or non-rigid plastic, for providing vertical alignment with the holes 54 and 64 when inserted within the channel 60. In one embodiment, the adapter 114 is configured such that when rotated 180 degrees about its vertical axis, the adapter 114 may be used with interior channels 60 of different standard or non-standard sizes. In the embodiment shown, the adapter 114 is configured with a plurality of saw tooth edges 116 that potentially engage the internal side surfaces of the structure 28 when inserted therein. With a saw tooth configuration of edges 116, the adapter 114 is capable of conforming to different interior channel sizes. Alternatively, the nut holder 110 may be held in vertical alignment with holes 54 and 64 by spring wires 118 coupled to the nut holder 110, as best shown in FIGS. 4 and 10.

The securement and anti-chatter assembly may further include a sleeve 40, preferably constructed of metal or hard plastic, which can be slid over the elongated portion 78 of the hitch pin 32. When assembled, the sleeve 40 extends through the aligned holes 56, 66 and into the interior channel 60 of the structure 28, as best shown in FIG. 2. The sleeve 40 is dimensioned such that the hitch pin/sleeve arrangement fits tightly within the side holes 56 and 66 of the hitch receiver 24 and the hitch receiver attachment structure 28, respectively. The exterior end of the sleeve 40 is configured to engage the lock opening of the pin lock 100, as will be described in more detail below, to ensure a tight fit between the components.

In accordance with an aspect of the present invention, the hitch pin 32 may be configured to include an annular groove 130 disposed between the threaded section 84 and the locking groove 80, as best shown in FIG. 2. The annular groove 130 is configured to receive a sealing mechanism 134, such as a conventional o-ring, to provide a seal between the hitch pin 32 and the sleeve 40 when assembled. The sealing engagement between the hitch pin 32 and the sleeve 40 functions to protect the internal parts of the lock 100 from water, debris, etc.

Figure 3:
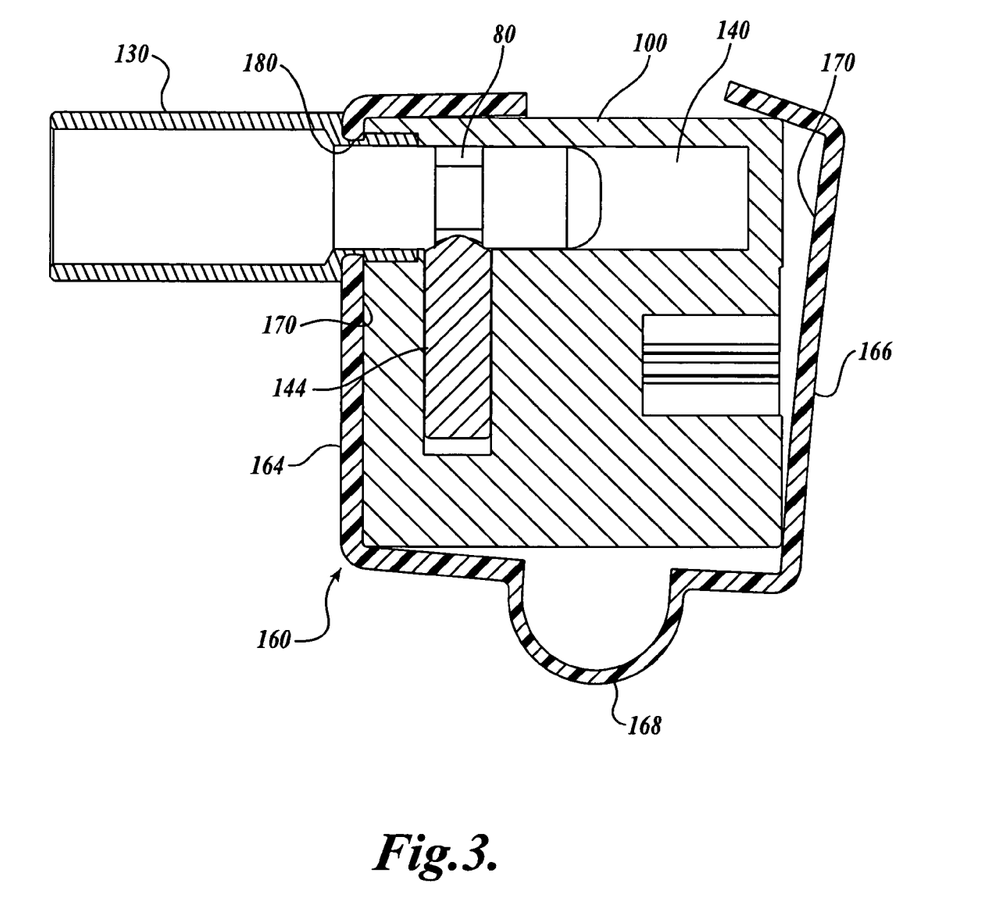
FIG. 3 is a partial cross-sectional view of the lock of FIG. 2.

As was described above, the hitch pin 32 may be locked in the assembled position by a pin lock 100 or other locking mechanism. The pin lock 100 receives the end of the hitch pin 32 within its lock opening 140, as best shown in FIG. 3. When inserted in the lock opening 140 an appropriate distance, the biasing plunger 144 of the lock 100 engages and locks onto the locking groove 80 of the hitch pin 32 for preventing unauthorized removal of the hitch pin 32 from the hitch receiver attachment structure 28. A selectively removable lock cover 160 may be provided to help protect the internal parts of the lock 100 from water, debris, etc. during use. The lock cover 160 includes two cap sections 164 and 166 interconnected by a resilient section 168 that allows one section to bend away from the other and vice versa. Each cap section 164 and 166 defines an open ended cavity 170 for receiving a portion of the lock 100 therein, as best shown in FIG. 3. One of the cap sections 164 includes an aperture 180 that is coaxially aligned with the lock opening 140 when assembled. In one embodiment, the aperture 180 and lock opening 140 are sized to receive the end of the sleeve 40 in a press fit relation for connecting the components in a sealing relationship.

Figure 7:
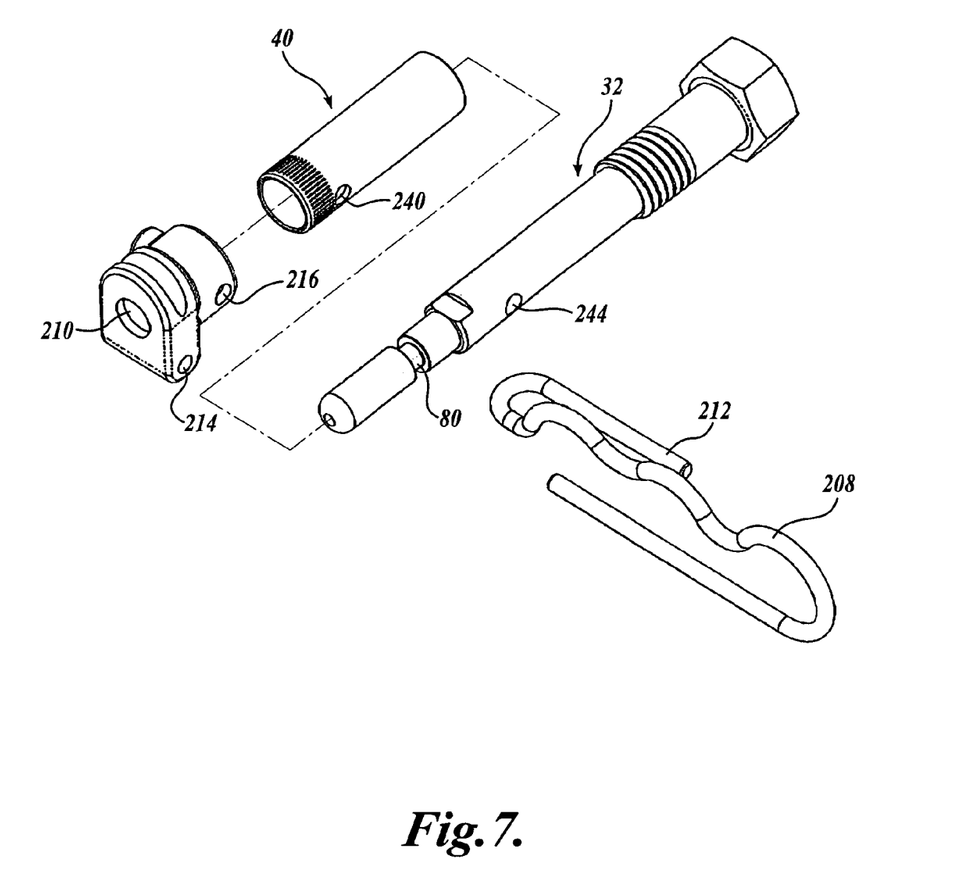
FIG. 7 is an exploded perspective view of several components of another alternative securement and anti-chatter assembly suitable for incorporation in the embodiments of FIGS. 1 and 4.

In accordance with another aspect of the present invention, the sleeve 40 may be retain in place and/or the hitch pin may be restricted from removal when assembled by a spring clip assembly 200, as best shown in FIG. 4. The spring clip assembly 200 includes a guide member 204 and a spring clip 208. The guide member 204 includes a central bore 210 configured to receive one end of the sleeve 40 and the hitch pin 32 therethrough. The guide member 204 further includes apertures 214 and 216 for receiving portions of the spring clip 208. The sleeve is configured with a slot 220 and the hitch pin 32 is configured with an engagement groove 230. The slot 220 and the engagement groove 230 are positioned to be aligned with the aperture 216 when assembled. The spring clip 208 may then be inserted into the apertures 214 and 216 and into engagement with the slot 220 and the engagement groove 230 to couple the sleeve 40 to the hitch pin 32. In the embodiment shown in FIG. 7, the sleeve 40 and hitch pin 32 include apertures 240 and 244 instead of slot 220 and engagement groove 230 for receiving a portion 212 of the spring clip therethrough. As shown in FIG. 4, the spring clip assembly 200 is configured to work in conjunction with a locking mechanism, such as the pin lock 100.

Figure 8:
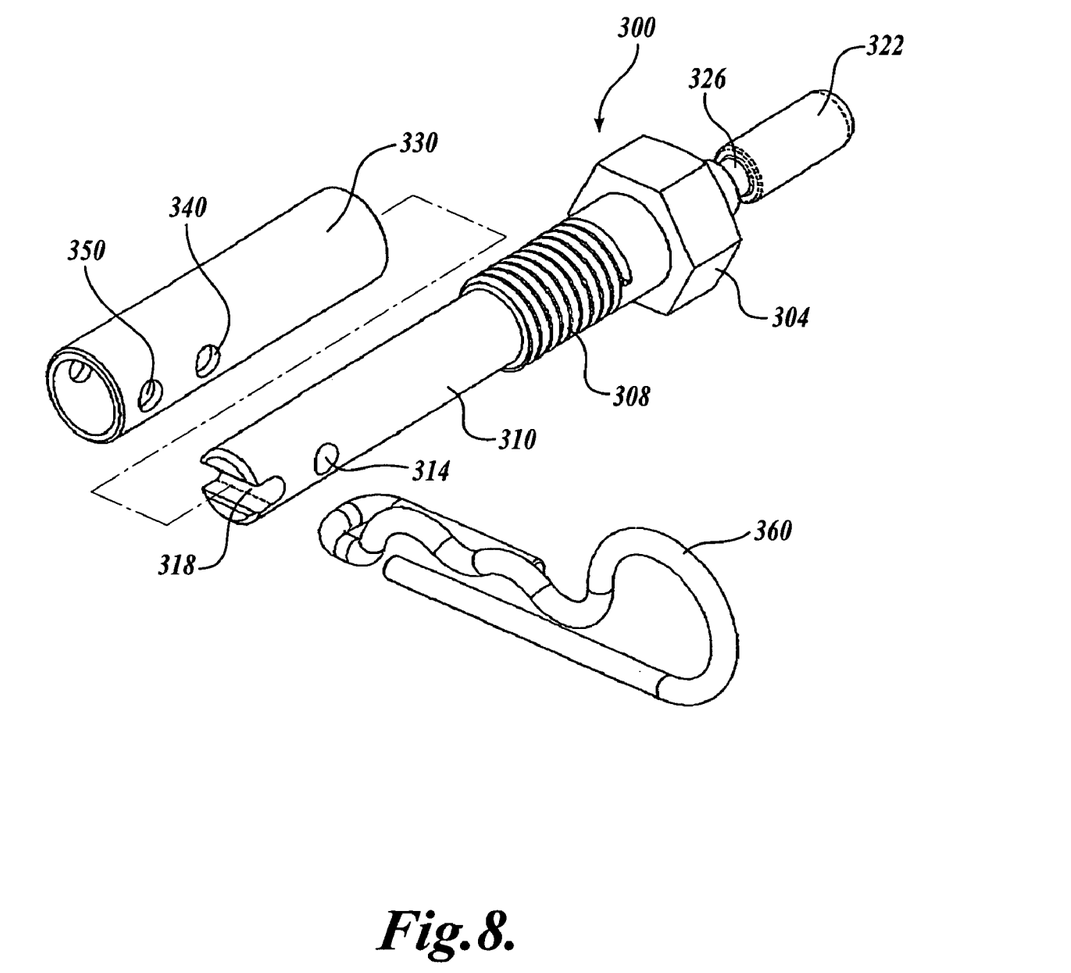
FIG. 8 is an exploded perspective view of several components of another alternative embodiment of a securement and anti-chatter assembly suitable for incorporation in the embodiments of FIGS. 1 and 4.
Figure 9:
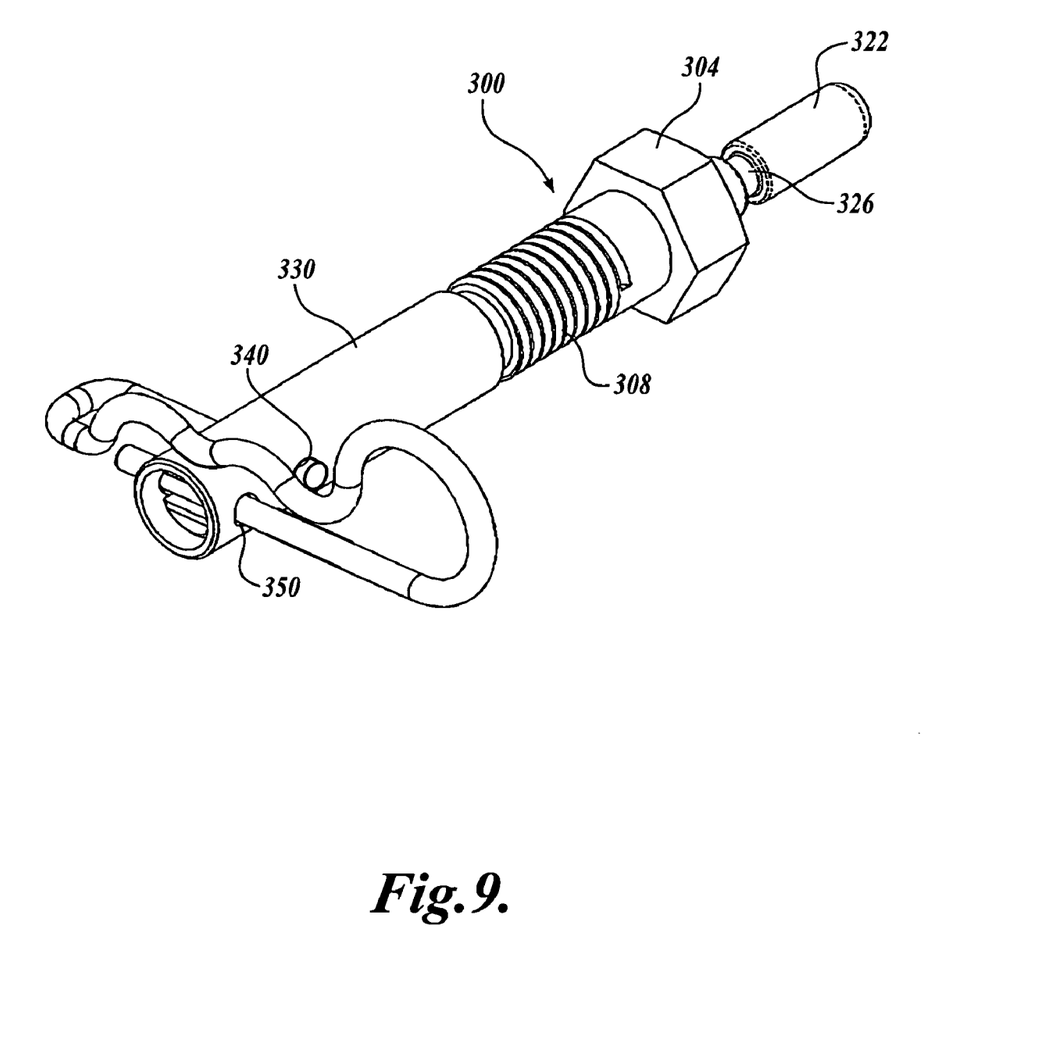
FIG. 9 is an assembled view of the securement and anti-chatter assembly of FIG. 8.

FIGS. 8 and 9 illustrate several components of another alternative embodiment of a securement and anti-chatter assembly suitable for incorporation in the embodiments of FIGS. 1 and 4. As best shown in FIG. 8, the components include a hitch pin 300 that includes a head portion 304, a threaded portion 308, and a reduced diameter portion 310. The reduced diameter portion defines a laterally positioned through bore 314 and a slot 318 formed in its end face. Extending from the head portion 304 there is provided a shank 322 that includes a locking groove 326. A sleeve 330 is included that defines two pairs of aligned apertures 340 and 350. When routed over the hitch pin 300, the sleeve can be positioned such that the through bore 314 is in alignment with the aligned apertures 340 and the slot 318 is aligned with the apertures 350, as best shown in FIG. 9. The sleeve 330 is then secured to the hitch pin 300 by a spring clip 360, portions of which are inserted into the aligned features of the respective components. For ease of illustration, a coupling structure, such as the internally threaded nut 36, that engages with the hitch pin to secure the hitch receiver 24 to the hitch receiver attachment structure 28 has been omitted from FIGS. 8 and 9.

To assembled the hitch assembly 20, the nut 36 is inserted within the internal channel 60 of hitch receiver attachment structure 28 or otherwise positioned in coaxially aligned with the hole 64. The hitch receiver attachment structure 28 is then inserted into the hitch receiver 24 until the side holes 64 and 66 of the structure 28 are aligned with the side holes 54 and 56 of the hitch receiver 24. The hitch pin 32 is then inserted into the aligned side holes 54 and 64 until the threaded section 84 of the hitch pin 32 engages the threaded portion of the nut 36. The hitch pin 32 is then rotated relative to the nut 36 to tighten the nut 36 against the inner side wall of the hitch receiver attachment structure 28. As the hitch pin 32 continues to be rotated relative to nut 36, the nut 36 exerts pressure against the inner side wall of the hitch receiver attachment structure 28, which in turn, clamps against the inner side wall of the hitch receiver 24. The head portion 74 of the hitch pin 32 allows the use of a wrench or similar tool to turn the hitch pin 32, which sufficiently tightens the nut 36 against the side wall of the hitch receiver attachment structure 28 so that relative movement between the hitch receiver attachment structure 28 and the hitch receiver 24 is minimized or even eliminated. Thus, the rattling or chatter of the hitch receiver attachment structure 28 and associated trailer or carrier mounts is minimized.

Next, the sleeve 40 is slid over the end of the hitch pin 32 and through the aligned holes 56 and 66. In one embodiment, the sleeve 40 can be first coupled to the lock 100 by press fitting the sleeve into the lock opening 140. It will be appreciated in embodiments where the lock cover 160 is desired, the cap section 164 is placed over the lock prior to insertion of the sleeve into the lock opening 140. Alternatively, the lock 100 can be attached after the sleeve 40 is positioned with respect to the hitch receiver 24. In either case, the hitch pin 32 is inserted into the lock opening 140 of the lock 100 for locking engagement therewith. Since the sleeve 40 is specifically configured to provide a tight fit into the holes 56 and 66, chatter and rattling may further be minimized. Additionally, the sleeve 40 increases the shear strength of the hitch pin 32 when assembled.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A kit suitable for use with a hitch receiver tube defining a generally rectangular socket and first and second opposed apertures, comprising:

a hitch receiver slide tube defining an interior channel, the hitch receiver slide tube having a generally rectangular cross-section of suitable dimensions to loosely translate within the hitch receiver tube socket, the hitch receiver slide tube defining opposed third and fourth apertures positioned so as to be alignable with the first and second hitch receiver tube apertures, respectively, when inserted into the hitch receiver tube;

a hitch pin including a proximal head portion, a threaded mid-portion and a distal end portion, the hitch pin configured to be inserted through the opposed apertures in the hitch receiver tube and the hitch receiver slide tube;

coupling structure insertable within the interior channel of the hitch receiver slide tube, the coupling structure configured to cooperatively engage with the threaded mid-portion of the hitch pin, the coupling structure further configured to be fixed against rotation and to align the coupling structure with the opposing third and fourth apertures of the hitch receiver slide tube when inserted therein;

a sleeve defining a central bore, the central bore sized and configured to receive the hitch pin therein, the sleeve further sized and dimensioned to be inserted through a pair of adjacent aligned apertures whereby the hitch pin and the overlying sleeve define a total diameter substantially equal to the diameter of the hitch pin where it passes through the opposed pair of adjacent aligned apertures; and a lock defining a lock opening, the lock opening being configured to receive therein an end of the sleeve in sealing engagement.

2. The kit of claim 1, further comprising a lock cover for protecting the lock from fluid or debris.

3. The kit of claim 1 wherein the coupling structure includes an adapter portion for providing alignment of the coupling structure with the apertures.

4. The kit of claim 3 wherein the adapter portion may be rotated to allow the coupling structure to be used with hitch receiver slide tubes having interior channels of differing dimension.

5. A kit suitable for use with a hitch receiver tube defining a generally rectangular socket and first and second opposed apertures, comprising:

a hitch receiver slide tube defining an interior channel, the hitch receiver slide tube having a generally rectangular cross-section of suitable dimensions to loosely translate within the hitch receiver tube socket, the hitch receiver slide tube defining opposed third and fourth apertures positioned so as to be alienable with the first and second hitch receiver tube apertures, respectively, when inserted into the hitch receiver tube;

a hitch pin including a proximal head portion, a threaded mid-portion and a distal end portion, the hitch pin configured to be inserted through the opposed apertures in the hitch receiver tube and the hitch receiver slide tube;

coupling structure insertable within the interior channel of the hitch receiver slide tube, the coupling structure configured to cooperatively engage with the threaded mid-portion of the hitch pin, the coupling structure further configured to be fixed against rotation and to align the coupling structure with the opposing third and fourth apertures of the hitch receiver slide tube when inserted therein;

a sleeve defining a central bore, the central bore sized and configured to receive the hitch pin therein, the sleeve further sized and dimensioned to be inserted through a pair of adjacent aligned apertures whereby the hitch pin and the overlying sleeve define a total diameter substantially equal to the diameter of the hitch pin where it passes through the opposed pair of adjacent aligned apertures; and a lock defining a lock opening, said sleeve being sealingly fixed within said lock opening and said sleeve and lock being slideable over the distal end of the hitch pin.

6. The kit of claim 5, further comprising a lock cover for protecting the lock from fluid or debris.

* * * * *